(12) United States Patent
Tjader

(10) Patent No.: US 7,578,636 B2
(45) Date of Patent: Aug. 25, 2009

(54) METHOD AND DEVICE FOR PIPE SPLITTING

(75) Inventor: Michael Tjader, New Richmond, WI (US)

(73) Assignee: TT Technologies, Inc., Aurora, IL (US)

( * ) Notice: Subject to any disclaimer, the term of this patent is extended or adjusted under 35 U.S.C. 154(b) by 156 days.

(21) Appl. No.: 11/463,365

(22) Filed: Aug. 9, 2006

(65) Prior Publication Data

US 2007/0036613 A1 Feb. 15, 2007

Related U.S. Application Data

(60) Provisional application No. 60/706,730, filed on Aug. 9, 2005.

(51) Int. Cl.
*F16L 55/18* (2006.01)
(52) U.S. Cl. .................. 405/184.3; 405/156; 138/97
(58) Field of Classification Search .............. 405/56, 405/184, 184.1, 184.3, 156; 138/97
See application file for complete search history.

(56) References Cited

U.S. PATENT DOCUMENTS

| | | | | |
|---|---|---|---|---|
| 4,505,302 A * | 3/1985 | Streatfield et al. | ............. | 138/97 |
| 4,648,746 A * | 3/1987 | Abinett | ................ | 405/184 |
| 4,674,914 A * | 6/1987 | Wayman et al. | .......... | 405/184.3 |
| 4,693,404 A * | 9/1987 | Wayman et al. | ............. | 405/156 |
| 4,732,222 A * | 3/1988 | Schmidt | .................... | 405/156 |
| 4,738,565 A * | 4/1988 | Streatfield et al. | ........ | 405/184.3 |
| 4,848,964 A * | 7/1989 | Yarnell | .................... | 405/184.3 |
| 5,127,481 A * | 7/1992 | Hesse | ......................... | 405/156 |
| 5,207,533 A * | 5/1993 | Federspiel et al. | .......... | 405/156 |
| 5,302,053 A * | 4/1994 | Moriarty | ................... | 405/184.3 |
| 5,439,320 A * | 8/1995 | Abrams | ................... | 405/184.3 |
| 5,816,745 A * | 10/1998 | Tenbusch, II | ............ | 405/184.3 |
| 5,876,152 A * | 3/1999 | Hesse | ...................... | 405/184.3 |
| 6,305,880 B1 * | 10/2001 | Carter et al. | ............. | 405/184.3 |
| 6,382,877 B1 * | 5/2002 | Hodgson | ................. | 405/184.3 |
| 6,499,912 B2 * | 12/2002 | Coon | ...................... | 405/184.3 |
| 6,524,031 B2 * | 2/2003 | Carter et al. | ............. | 405/184.3 |
| 6,755,593 B2 * | 6/2004 | Wentworth et al. | ...... | 405/184.3 |
| 2007/0048091 A1 * | 3/2007 | Tjader | ..................... | 405/184.3 |

* cited by examiner

*Primary Examiner*—Frederick L Lagman
(74) *Attorney, Agent, or Firm*—Schwegman, Lundberg & Woessner, P.A.

(57) ABSTRACT

A device and method for pipe replacement is shown. One advantage of devices and methods provided includes a splitting blade that provides a progressive cut into challenging pipe configurations such as ductile materials, thin walled pipes, corrugated pipes, or combinations of these properties. A pipe splitter and method is also shown that includes at least one hoop tensioning feature protruding from a body portion to pull the pipe against at least one splitting blade and increase splitting effectiveness.

14 Claims, 5 Drawing Sheets

METHOD AND DEVICE FOR PIPE SPLITTING

PRIORITY

This patent application claims the benefit of priority, under 35 U.S.C. Section 119(e), to U.S. Provisional Patent Appliation Ser. No. 60/706,730, filed on Aug. 9, 2005, which is incorporated herein by reference.

TECHNICAL FIELD

This invention relates to devices and methods for pipe replacement. Specifically, this invention relates to methods and devices for cutting or splitting pipe.

BACKGROUND

Trenchless replacement of many types of pipe material can be accomplished using pipe bursting if the pipe material in question is essentially brittle. In pipe bursting, an expander with a diameter larger than an inner diameter of the pipe is forced into the pipe, causing it to fracture into brittle pieces. In some situations, pipe formed from a more ductile material must be replaced. More ductile materials cannot be fractured or burst in a brittle manner due to their ductile properties. Ductile iron, for example is typically split using one or more rotatable cutter wheels that are pulled through the pipe to be replaced. The cutter wheels split a side of the pipe as they are pulled into the pipe.

Although typically classified a either "ductile" or "brittle," materials such as ductile iron lie on a continuum between brittle and ductile properties. Materials such as ductile iron are still relatively stiff, and their generally thick walled configuration provides significant rigidity during a splitting operation. As an expander or cutter is forced into a pipe having ductile properties, a certain level of axial stiffness is needed to keep the pipe from collapsing upon itself like an accordion if the required rigidity is not present. Therefore, as pipe materials become more ductile, and/or wall thickness becomes thinner, pipe splitting becomes more and more difficult. One example of a pipe configuration that is difficult to split is corrugated pipe such as corrugated steel often used in ditches or elsewhere along roadways.

What is needed is an improved splitter for difficult materials and/or pipe configurations such as thin walled pipe or corrugated pipe.

DETAILED DESCRIPTION

Figure 1:
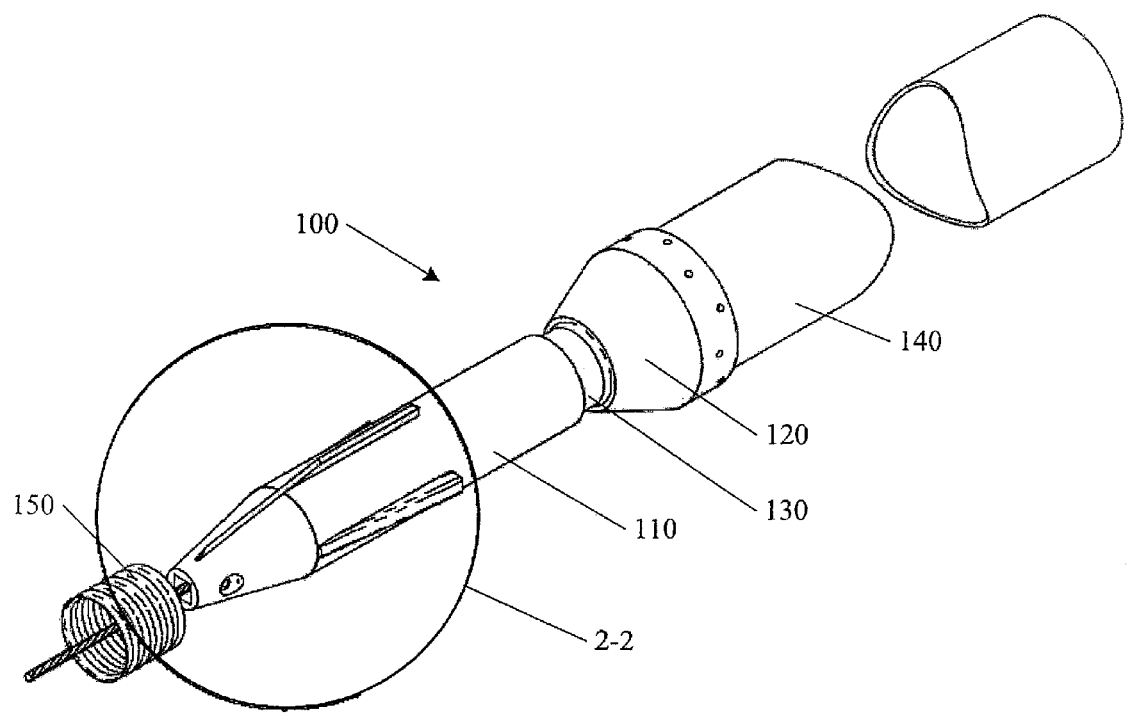
FIG. 1 shows an isometric view of a pipe splitting system according to an embodiment of the invention.

In the following detailed description, reference is made to the accompanying drawings which form a part hereof, and in which is shown, by way of illustration, specific embodiments in which the invention may be practiced. In the drawings, like numerals describe substantially similar components throughout the several views. In the following description, the term cable is defined to include metal cables, wire rope, or other lengths of material of suitable strength to pull devices as described below through a section of pipe. These embodiments are described in sufficient detail to enable those skilled in the art to practice the invention. Other embodiments may be utilized and structural, or logical changes, etc. may be made without departing from the scope of the present invention.

FIG. 1 shows a pipe splitting system 100. A section of pipe 150 to be split is also shown. In one embodiment, the pipe 150 includes corrugated pipe, such as corrugated steel, although the invention is not so limited. In one embodiment, the pipe splitting system 100 includes a splitter 110. In one embodiment, the splitter 110 is coupled to an pneumatic hammer 130. In one embodiment, the splitter 110 is also pulled through the pipe 150 using a cable as shown in FIG. 1. In selected embodiments, the pipe 150 is being replaced with an upsized replacement pipe 140. In one embodiment with an upsized replacement pipe 140, an expander 120 is also included in the pipe splitting system 100. One example embodiment is adapted to replace 16" diameter corrugated steel pipe with 24" diameter polyethylene pipe. Although relatively large diameter pipes are used in the present example, any number of pipe sizes, both smaller and larger, are within the scope of the invention.

Figure 2A:
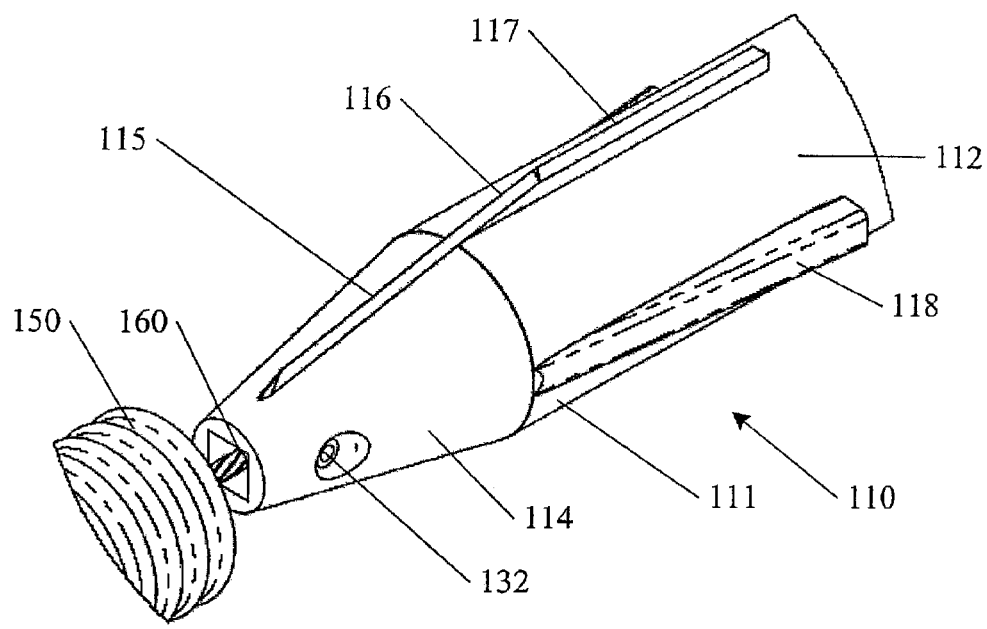
FIG. 2A shows a close up view the pipe splitting system shown in FIG. 1 according to an embodiment of the invention.

FIG. 2A shows a close up view of the splitter 110 shown in FIG. 1. The splitter 110 is shown pulled by a cable 160 that is attached at cable attachment location 132. A section of corrugated pipe 150 is also shown as an example pipe to be split.

The splitter 110 as shown includes a body 111. In one embodiment, the body 111 includes a rear portion 112, and a leading tapered portion 114. In one embodiment, the rear portion 112 includes a cylindrical portion. In one embodiment, the leading tapered portion 114 includes a cone shaped portion. Although a cone shaped taper is shown, the invention is not so limited. Other tapers such as a tapered portion offset from a center axis of the body 111 are also possible.

The leading tapered portion 114 in FIG. 2A tapers down from a diameter of a cylindrical rear portion 112 to a smaller diameter at the tip of the body 111. In one embodiment, a splitter 110 is sized and chosen to split a particular diameter pipe. In one embodiment, the diameter of the rear portion 112 is larger than an inner diameter of a pipe to be split, and the diameter of the tip of the leading tapered portion 114 is smaller than the inner diameter of the pipe to be split. In operation, the tip of the leading tapered portion 114 fits inside the pipe to be split, and as it is pulled into the pipe, the larger diameter of the rear portion 112 forces the pipe to split. In embodiments of the present invention, other features further facilitate splitting of the pipe, as discussed below.

A splitting blade 116 is shown coupled to the body 111 in FIG. 2A. In one embodiment, in contrast to splitters with rotating cutting wheels, the splitting blade 116 is fixed to the body 111. The splitting blade 116 shown in FIG. 2A includes a leading blade portion 115 and a trailing portion 117. Although a leading portion 115 and a trailing portion 117 are shown, the invention is not so limited. Further, although portions of the splitting blade 116 include a straight edge, alternative embodiments include curved edges on splitting blades 116 or portions of splitting blades. In one embodiment, the splitting blade 116 is formed from a material exhibiting both high hardness and high toughness. In one embodiment, the blade 116 is formed from a hardened and tempered tool steel. In one embodiment, the blade 116 is formed from a material including carbide grains such as tungsten carbide. High hardness and high toughness materials are suited for use with difficult pipe materials and configurations such as corrugated material.

An advantage of including a splitting blade 116 on the leading tapered portion 114 includes providing a progressive cut at the initial point of contact with the pipe. In ductile materials and/or thin walled pipe, cutting wheels provide point contacts at a tangent of the wheels as they meet the pipe. In such configurations, the cutting wheels tend to crumple the pipe, instead of cutting. The tendency of cutting wheels to crumple less rigid pipe configurations is further aggravated, in corrugated pipe.

In one embodiment, a hoop tensioning feature 118 is included, and protrudes from the body 111. A ramped hoop tensioning feature 118 is shown in FIG. 2A. In operation, a hoop stress is created in the pipe due to outward pressure from the hoop tensioning feature 118. The hoop stress further facilitates cutting of the pipe wall as the pipe is pulled onto the splitting blade 116. The effect of at least one hoop tensioning feature 118 is further illustrated and discussed under FIG. 2B below.

As shown in FIG. 2A, in one embodiment, the hoop tensioning feature 118 protrudes from a surface of the body 111. One advantage of a protruding hoop tensioning feature 118 includes lower friction during a splitting operation. In one embodiment the hoop tensioning feature 118 is formed from a hard material relative to the pipe material, or otherwise formed from a material having low friction with the pipe material by other mechanisms. The use of a protruding hoop tensioning feature 118 provides a lower contact surface with the pipe than if the entire surface of the body 111 were expanded.

Figure 2B:
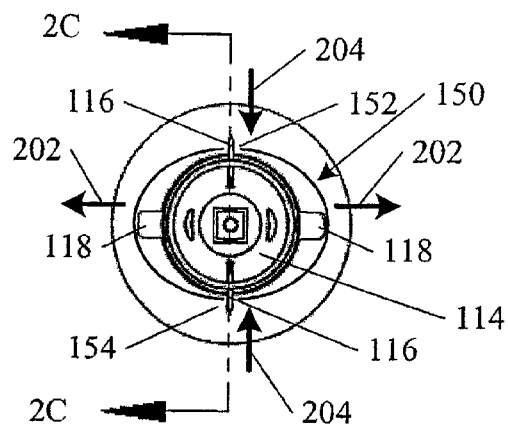
FIG. 2B shows a front view of a pipe splitting system according to an embodiment of the invention.

FIG. 2B shows the splitter 110 from a front view with the pipe 150 shown in a line diagram form. In FIG. 2B, a pair of splitting blades 116 and a pair of hoop tensioning features 118 are shown, although the invention is not so limited. Other embodiments include one splitting blade 116, or one hoop tensioning feature 118, or multiples of splitting blades 116, or multiples of hoop tensioning features 118.

The pipe 150 is shown with a first split 152 and a second split 154 corresponding to splitting blade 116 locations. As discussed above, the hoop tensioning features 118 force the pipe outwards as indicated by arrows 202. This results in a hoop stress in the pipe 150 that in turn pulls the pipe down onto the splitting blades 116 as indicated by arrows 204.

Figure 2C:
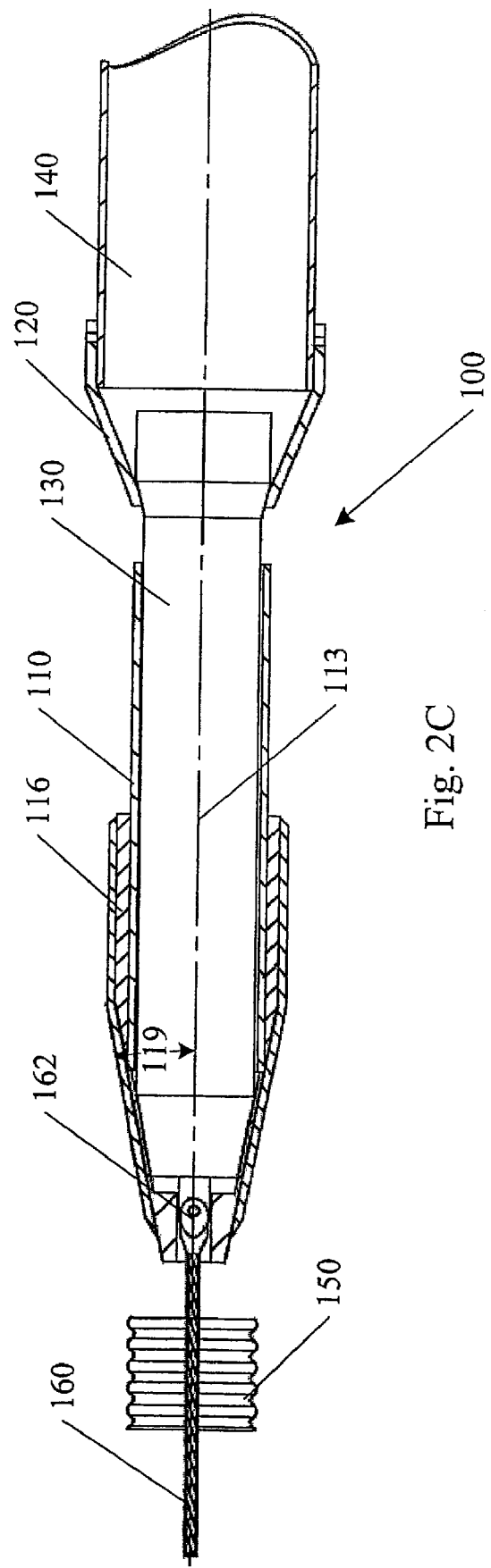
FIG. 2C shows a cross section view of a pipe splitting system according to an embodiment of the invention.

FIG. 2C shows a cross section of the pipe splitting system 100. The splitting blade 116 is shown at an angle 119 with respect to the axis 113 of the splitting system 100. In one embodiment, the splitting blade is oriented at an angle 119 lower than 45 degrees. In one embodiment, the angle 119 is approximately 15 degrees. As discussed above, certain pipe properties or combinations of properties (ductile, thin walled, corrugated, etc.) make a pipe more susceptible to crumpling along the axis 113 as the splitter 110 is drawn into the pipe. It is desirable to reduce crumpling, and to promote controlled splitting of the pipe. In one embodiment, features of the splitter 110, such as the angle 119, provide a progressive cut as the tapered leading portion of the splitter 110 enters the pipe 150.

As shown in FIG. 2C, in one embodiment, the splitting blade continues past the leading tapered portion onto the rear portion of the body. In one embodiment, the elongated splitting blade further enhances the splitting operation. Although a straight splitting blade portion is shown on the leading tapered portion, as discussed above the invention is not so limited. In curved splitting blade embodiments, one method of determining a blade angle 119 includes mathematically calculating a best fit line through a curved blade profile, and calculating an angle with the best fit line.

As shown in FIG. 2C, in one embodiment, a replacement pipe 140 is pulled behind the splitting system 100 to take the place of the pipe 150. In one embodiment the replacement pipe 140 includes approximately the same inner diameter as the pipe 150 being replaced to maintain a flow capacity. In one embodiment, as shown in FIG. 2C, the replacement pipe 140 includes a larger inner diameter than the pipe 150 being replaced to increase a flow capacity. As shown in FIG. 2C, in one embodiment, an expander 120 is coupled to the splitting system 100 to make room for the replacement pipe 140.

The pneumatic hammer 130 is shown in relation to the splitter 110 in FIG. 2C. As shown in the Figure, in one embodiment, the splitter 110 is hollow, and accepts the insertion of the pneumatic hammer 130 within a central opening. The pneumatic hammer 130 engages the splitter at the leading tapered portion of the splitter 110. A rear portion of the pneumatic hammer 130 is used to engage the expander 120 in selected embodiments. As discussed above, in selected embodiments, a cable 160 is further used to urge the splitter 110 forward through the pipe 150.

Figure 3:
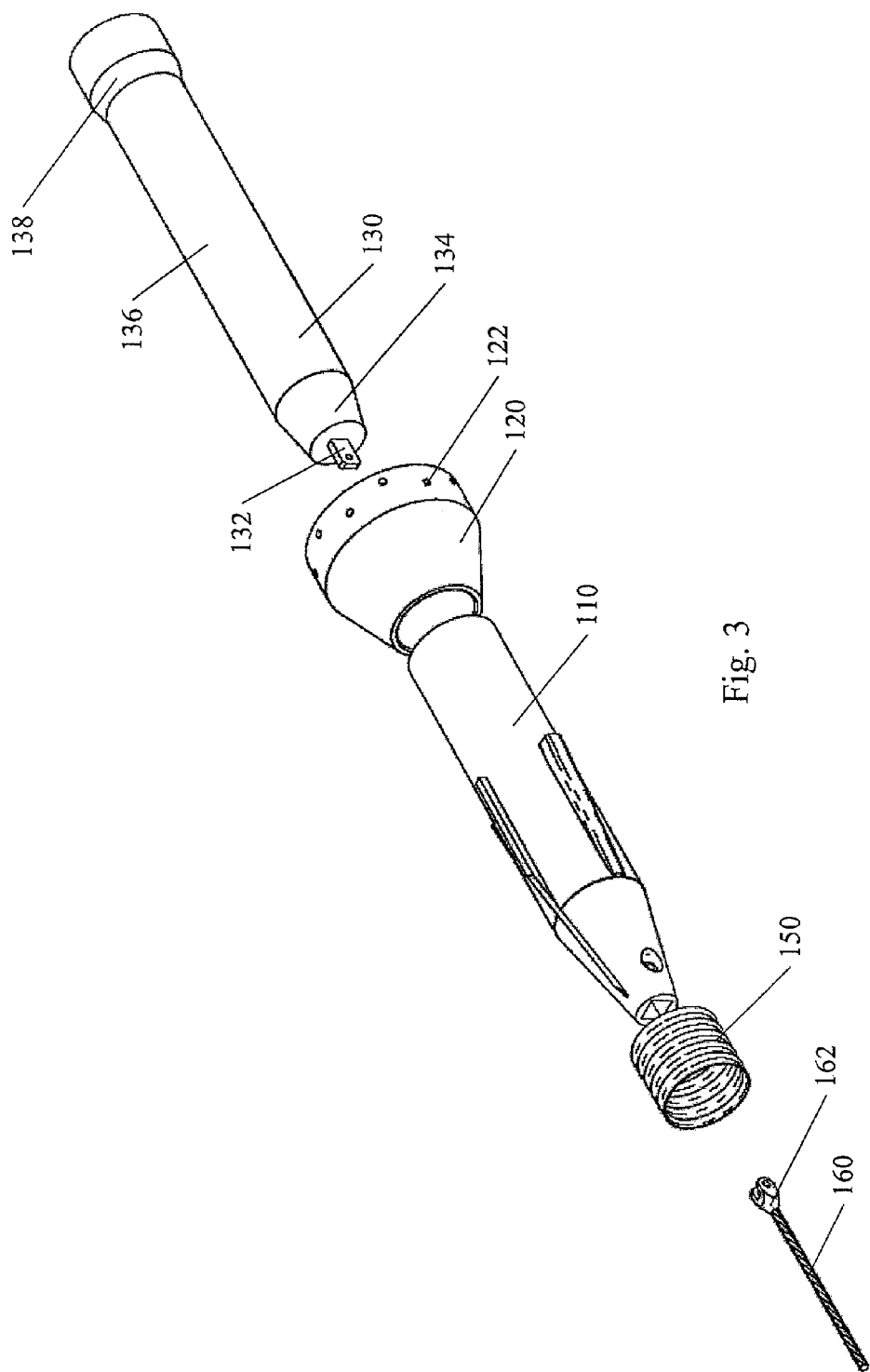
FIG. 3 shows an exploded view of a pipe splitting system according to an embodiment of the invention.

FIG. 3 shows an exploded view of the pipe splitting system 100. As can be seen in FIG. 3, in one embodiment, a cable 160 is attached directly to a pneumatic hammer 130 using a cable fastener 162 and the cable attachment location 132. In one embodiment, the cable fastener includes a clevis device, although other fastener configurations are also within the scope of the invention.

Figure 4:
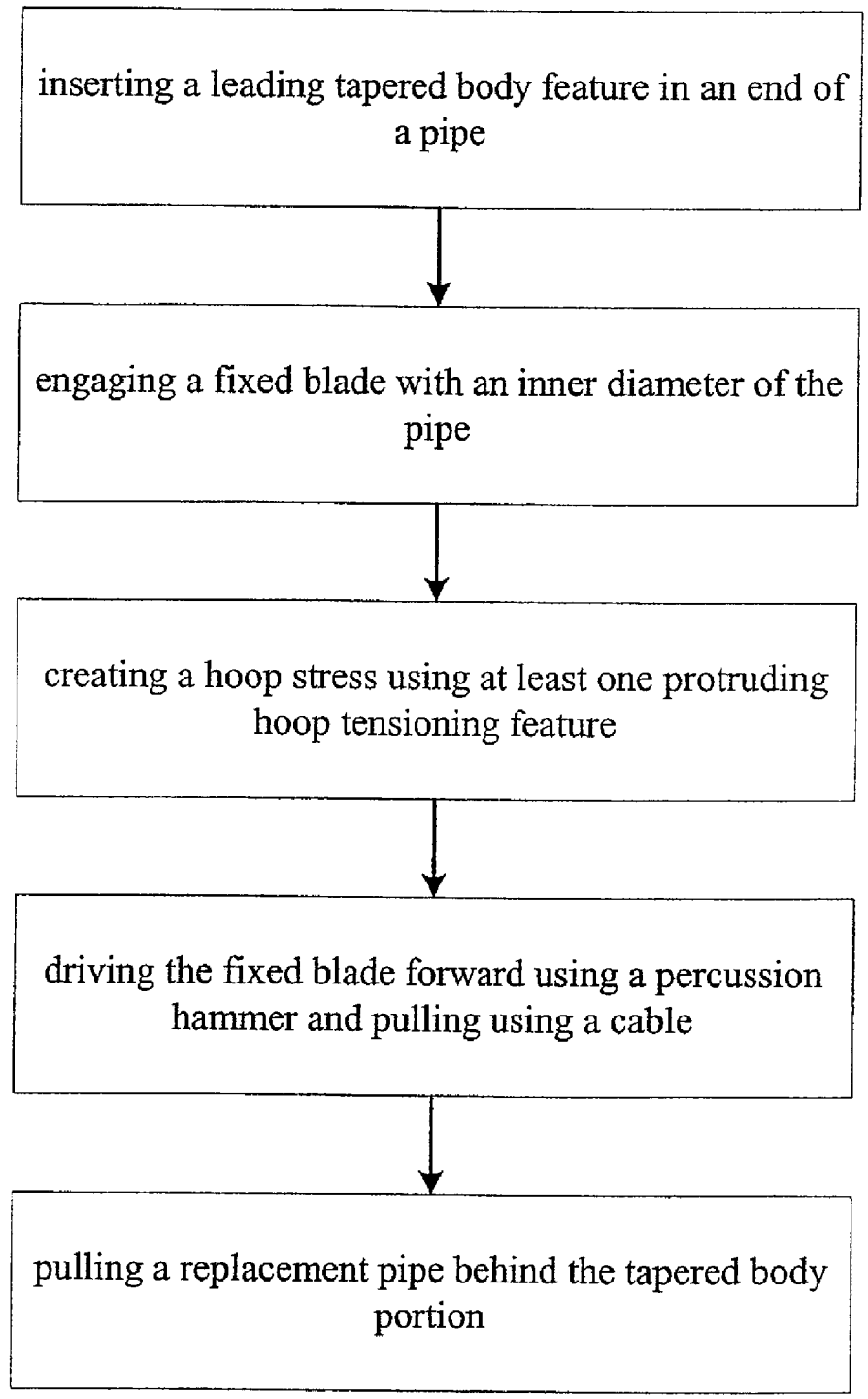
FIG. 4 shows a flow diagram of one pipe splitting method according to an embodiment of the invention.

FIG. 4 shows a method of splitting a pipe according to one embodiment of the invention. In one embodiment, the method is used to split corrugated pipe. A leading tapered body feature is inserted into an end of a pipe. A fixed blade then engages an inner diameter of the pipe. In one embodiment, as the leading tapered body feature is moved through the pipe, a hoop stress is created in the pipe as a result of contact with at least one protruding hoop tensioning feature. In one embodiment a reduced friction is achieved by using a protruding hoop tensioning feature. In one embodiment, the leading tapered body feature moves through the pipe as a result of forces provided by a percussion hammer from behind the leading tapered body feature. In one embodiment, the leading tapered body feature moves through the pipe as a result of forces provided by a cable and cable pulling device coupled in front of the leading tapered body feature. In one embodiment, as indicated in FIG. 4, a combination of both a percussion hammer and a cable moves the leading tapered body feature through the pipe, splitting the pipe as it goes. In one embodiment, a replacement pipe is pulled behind concurrent to the splitting operation. In one embodiment, the replacement pipe is of a larger diameter than the pipe being replaced.

CONCLUSION

Embodiments of pipe splitters as described above have a number of advantages. One advantage includes a fixed splitting blade that provides a progressive cut into challenging pipe configurations such as ductile materials, thin walled pipes, corrugated pipes, or combinations of these properties. A fixed blade as provided in embodiments above spreads out cutting forces more evenly, reducing a tendency for the pipe to crumple during a splitting operation. Another advantage includes at least one hoop tensioning feature protruding from a body portion to pull the pipe against at least one splitting blade and increase splitting effectiveness. Another advantage of embodiments described above includes the use of both pneumatic driving force from behind, and cable pulling force from in front to provide a consistent tension during cutting in combination with percussive bursts. This combination is particularly effective when cutting difficult pipe configurations as described above.

While a number of advantages of embodiments of the invention are described, the above lists are not intended to be exhaustive. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and methods are used. The scope of the invention should be determined with reference to the appended claims, along with the full scope of equivalents to which such claims are entitled.

I claim:

1. A pipe splitter, comprising:
    a body, having a diameter larger than an inner diameter of a pipe to be split;
    a leading tapered portion having a taper from the body diameter to a diameter smaller than the inner diameter;
    at least one splitting blade fixed along a part of the leading tapered portion; and
    at least one hoop tensioning feature protruding from the body, wherein the hoop tensioning feature and the splitting blade are not aligned on the body.

2. The pipe splitter of claim 1, wherein an edge of the splitting blade forms an angle of approximately 15 degrees with a central axis of the body.

3. The pipe splitter of claim 1, wherein the blade material includes a hardened and tempered tool steel.

4. The pipe splitter of claim 1, wherein at least one splitting blade includes a pair of splitting blades substantially opposite each other on the leading tapered portion.

5. A pipe splitting system, comprising:
    a body, having a first diameter larger than an inner diameter of a pipe to be split, the body including a leading tapered portion having a taper from the first diameter to a second diameter, wherein the second diameter is smaller than the inner diameter;
    a cable attachment located at a front end of the leading tapered portion;
    a percussion hammer to provide a percussive force at the leading tapered portion;
    at least one splitting blade fixed along a part of the leading tapered portion; and
    at least one non-cutting, hoop tensioning feature protruding from the body.

6. The pipe splitting system of claim 5, wherein an edge of the splitting blade forms an angle of approximately 15 degrees with a central axis of the body.

7. The pipe splitting system of claim 5, wherein at least one splitting blade includes a pair of splitting blades substantially opposite each other on the body.

8. The pipe splitting system of claim 5, wherein at least one hoop tensioning feature includes a pair of hoop tensioning features substantially opposite each other on the body.

9. The pipe splitting system of claim 5, further including an expander located adjacent to a trailing end of body.

10. The pipe splitting system of claim 5, wherein the cable attachment is on a front portion of the percussion hammer.

11. A method of splitting corrugated pipe, comprising:
    inserting a leading tapered body feature in an end of a corrugated pipe, the leading taper including a front portion with a diameter smaller than an inner diameter of the corrugated pipe, and a rear portion with a diameter larger than the inner diameter;
    engaging a fixed blade with a portion of the inner diameter as the leading tapered body feature enters the corrugated pipe;
    creating a hoop stress using at least one protruding hoop tensioning feature not aligned with the fixed blade; and
    driving the fixed blade forward using a percussion hammer.

12. The method of claim 11, further including pulling the tapered body feature forward using a cable.

13. The method of claim 11, further including concurrently drawing a replacement pipe behind the tapered body portion as the corrugated pipe is split.

14. The method of claim 13, wherein drawing the replacement pipe behind the tapered body portion includes expanding a soil region adjacent to the split corrugated pipe, wherein the replacement pipe has a larger outer diameter than the corrugated pipe.

* * * * *

UNITED STATES PATENT AND TRADEMARK OFFICE
CERTIFICATE OF CORRECTION

PATENT NO. : 7,578,636 B2  Page 1 of 1
APPLICATION NO. : 11/463365
DATED : August 25, 2009
INVENTOR(S) : Michael Tjader It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 172 days.

Signed and Sealed this

Seventh Day of September, 2010

David J. Kappos
*Director of the United States Patent and Trademark Office*